United States Patent [19]

Orpin

[11] Patent Number: 5,378,793
[45] Date of Patent: Jan. 3, 1995

[54] PROCESS FOR HARDENING PHENOLIC RESINS

[75] Inventor: Murray R. Orpin, Dyffryn, Wales

[73] Assignee: BP Chemicals Limited, London, England

[21] Appl. No.: 960,008

[22] Filed: Oct. 13, 1992

[30] Foreign Application Priority Data

Oct. 25, 1991 [GB] United Kingdom ............... 9122654
Jun. 3, 1992 [GB] United Kingdom ............... 9211695

[51] Int. Cl.$^6$ .............................................. C08G 8/04
[52] U.S. Cl. ................................... 528/158; 525/500; 528/129; 528/167; 523/145; 523/147
[58] Field of Search ............. 528/158, 129, 167; 523/145, 147; 525/500

[56] References Cited

U.S. PATENT DOCUMENTS

| | | | |
|---|---|---|---|
| Re. 32,812 | 12/1988 | Lemon et al. ............... | 523/145 |
| 4,246,157 | 3/1979 | Laitar ............... | 528/155 |
| 4,331,583 | 5/1982 | Everett ............... | 528/141 |
| 4,622,173 | 11/1986 | Broze et al. ............... | 252/174.21 |
| 4,661,280 | 4/1987 | Ouhadi et al. ............... | 252/174.24 |
| 4,786,431 | 11/1988 | Broze et al. ............... | 252/174.21 |
| 5,057,238 | 10/1991 | Broze et al. ............... | 252/174.21 |

Primary Examiner—Herbert J. Lilling
Attorney, Agent, or Firm—Brooks Haidt Haffner & Delahunty

[57] ABSTRACT

This invention relates to a hardener for producing phenolic resins from phenolic resoles which comprises a partial phosphate ester. The hardener is produced by reacting condensed phosphoric acids with polyols at controlled temperatures with vigorous agitation under vacuum until constant acidity is achieved. The hardeners cure the phenolic resoles relatively slowly and therefore enable better control to be achieved when preparing moulded products.

10 Claims, No Drawings

PROCESS FOR HARDENING PHENOLIC RESINS

The present invention relates to a process for producing hardened phenolic resins, especially phenol-aldehyde resins from phenolic resoles using a delayed action hardener.

The hardening of phenolic resoles by the addition of strong acids is well known. The following acids have hitherto been used: hydrochloric, sulphuric, phosphoric, trichloracetic and sulphonic acids either alone or as mixtures thereof. Most often these acids are employed as aqueous solutions at concentrations varying from 20 to 60%. These hardeners normally cause the resoles to harden rapidly even at ambient temperatures.

For certain end uses, e.g. for producing reinforced composites, phenolic resoles need to be hardened to resins in the presence of reinforcing agents which are usually fibres whether woven or non-woven. Examples of woven fibres include inter alia those derived from glass, e.g. glass mats, cloth, asbestos and polyamides. Examples of non-woven fibres include inter alia those derived from cellulosic fibres, glass and high molecular weight polyesters. After hardening, the reinforced composite comprising the phenolic resin and the reinforcing agent is then cured at about 90° C. During the manufacture of these reinforced composites it is desirable to retard the rate of hardening of the phenolic resole in order to minimise premature gelation of the resole. Specific examples of processes where retardation of the hardening step is desirable include inter alia the manufacture of reinforced composites such as prepregs, filament windings impregnated with phenolic resins. Other examples of processes which may benefit from this method are: contact moulding and pultrusion. In addition, further advantages of such delayed action hardeners include the facility of carrying out resin transfer moulding with 'hot' isothermal tooling thereby shortening production cycles. This was hitherto difficult to achieve using conventional acid hardeners.

The equipment used for the manufacture of reinforced composites such as those referred to above basically comprises an impregnation tank containing the phenolic resole and a hardener. The reinforcing agent such as glass fibres are immersed into the resole/hardener mixture in the tank in order to impregnate the reinforcing agent with the resin. After impregnation, the fibres are wound on a mandrel. In such a process it is desirable that the phenolic resole has a long pot life or gel time, i.e. it does not harden too rapidly. Rapid or premature hardening of the resole into the resin in the tank can result in loss of resole because the hardened resin cannot impregnate the reinforcing agent and may also constitute a safety hazard if a bulk exotherm is allowed to occur.

In most processes associated with the production of wet resin based reinforced composites, the pot-life or gel-time of the resole being used is critical in exercising control of the impregnation, cycling, hardening and curing stages of the process. In the case of resoles hardened by acids to resins, pot-lives are short, typically of the order of 4–30 minutes, and the process has to be controlled by use of various expedients.

One such method is the control of the concentration of the acid hardener used. It is well known that the lower the concentration of the hardener, the slower the hardening process. One of the methods used to reduce the hardener concentration is to use a significantly diluted version of the acid. This can be achieved by diluting the hardener with a solvent such as water. In this method, the catalyst concentration is reduced to below 20% w/w in the solution used. However, such a method introduces considerable quantities of water which, while effective in slowing down the hardening reaction, gives rise to imperfections such as lumps and pin holes in the hardened composites. It has also been proposed to replace the water completely with organic solvents in order to obtain the desired dilution of the acid hardener. In this case, significant quantities of solvents remain entrapped in the finished composite which thereby has poorer mechanical properties and often displays fissuring. Moreover, the excessive use of solvents poses questions of storage and toxicity.

It is therefore desirable to have hardeners which can retard the hardening of the phenolic resoles for a significant duration not only to enable effective control of the hardening process thereby minimising undesirable losses due to premature hardening but also to minimise the levels of solvents used in the process.

Accordingly, the present invention is a hardener for producing phenolic resins from phenolic resoles said hardener comprising a partial phosphate ester.

By "partial phosphate ester" is meant here and throughout the specification esters that are produced by reacting condensed phosphoric acids with polyols at strictly controlled temperatures with vigorous agitation under vacuum and with control of free acidity i.e. until constant acidity values are attained.

The method of producing the partial phosphate esters is claimed and described in published International Application number WO 93/05118 and can be summarised as follows:

1) A polyol or blend of polyols which is a mobile liquid at temperatures between 100° C. and 135° C., is placed in a sealed reactor made of a material resistant to acid and capable of withstanding the reaction temperatures and a vacuum of at least 600 mm Hg. The reactor is provided with a vacuum pump to attain the desired vacuum, a stirrer and a controlled heating mechanism.

2) To the stirred polyol or blend under vacuum and controlled temperature is slowly added condensed phosphoric acid in order to avoid local build up of any excess acidity and to minimise the presence of unreacted free acid at any given time in the reactor.

3) Upon completion of the addition of the phosphoric acid, the reaction conditions are maintained until the acid value of the mixture is constant.

4) The reaction product so formed will be a pale, viscous amber liquid and comprises the partial phosphate ester. This product can be used as such or refined further before reaction with the functional polymers.

The phosphoric acid reactant used is suitably any orthophosphoric acid or an acid which represents a condensate of orthophosphoric acid. The phosphoric acid used should either be in liquid form or in a finely divided form in order to facilitate the reaction thereof with the polyol or polyol blend. Thus, pyrophosphoric acid (which can be said to correspond to 105% orthophosphoric acid), tetraphosphoric acid (which can be said to correspond to 115% orthophosphoric acid) or phosphorus pentoxide (which can be said to correspond to 138% orthophosphoric acid with 1.5 moles of water removed) can be used.

Examples of the polyols that can be used to produce the partial phosphate esters include the following or blends of two or more of these:

Glycerol, pentaerythritol, inositol, sucrose, the monosaccharides and hydroxy functional polymers such as those derivable from polystyrene and alkyl alcohols. Glycerol and blends thereof with other polyols are preferred.

The control of the degree of esterification of the three functionalities of the orthophosphoric acid reactant is achieved by monitoring the acid value of the product. The acid value is determined by potentiometric titration against an aqueous potassium hydroxide solution.

Normally, in a titration of orthophosphoric acid against a strong base such as KOH, the neutralisation of each of the functionalities of orthophosphoric acid is indicated by an end point at a separate pH value thus showing three end points in all. Thus, when orthophosphoric acid is titrated against a molar excess of KOH, it shows end points at pH values of 4.5, 9.0 and 13. In this process, if a monoester is being neutralised by KOH, the end points would lie at pH values of 4.5 and 9.0. However, if a diester is being neutralised, only one end point would be seen, i.e. at a pH of 4.5.

It therefore follows that if a mixture of mono- and di-esters is titrated against KOH, then the proportion of mono- and di-esters in the mixture can be evaluated from the ratios between the acid values at pH 4.5 and 9.0. A mono-ester will therefore be 50% first functionality and 50% second functionality. The value of titration to the first end point will be exactly half of the total titration to the second end point.

Thus, in an example of the reaction between orthophosphoric acid:pentaerythritol:glycerol in respective molar ratios of 2:1:1, the final acid value of the partial phosphate ester would be about 375 mgms/g KOH.

A particular feature of these partial phosphate esters is that at ambient temperature these have very low acid value, i.e. up to 600 mgm KOH/g of the ester. These esters suitably have a phosphorous content of about 15-25% w/w. However, these esters will apparently undergo dissociation at elevated temperature to release free acid which in effect is the hardener. A specific example of such an ester is BUDIT 381 (Regd. Trade Mark, ex CHEMISCHE FABRIK BUDENHEIM, GERMANY), a partial proprietary ester formed by reacting orthophosphoric acid, ethane diol and pentaerythritol in the respective molar ratios of 2:1:0.75 using the process described above. The resultant product has an acid value of about 548 mg KOH/g and a phosphorus content of about 22% w/w and dissociates at elevated temperatures.

The partial phosphate ester is suitably used as a solution which contains at least 70% w/w of the ester in solution in a solvent, preferably from 70-80%, more preferably a 75% w/w solution. The solvent used can be water or an organic solvent such as an alcohol, suitably an aliphatic alcohol.

The partial phosphate ester used as hardeners in the present invention can be used with all conventional acid-hardenable phenolic resoles to generate the corresponding hardened resins.

The partial phosphate esters used in the present invention are suitably employed in aqueous solutions defined above. These esters may be used as such or as a blend thereof with conventional acid hardeners. The latter acid hardener may be present in the blend suitably in an amount from 2-50% w/w, preferably e.g. 5% w/w of the total hardener used. The conventional acid hardener when used is suitably an aromatic sulphonic acid e.g. p-toluene sulphonic acid. Use of such blends allows a wide range of variables to control the activity of the hardener and hence the optimisation of the physical properties of the hardened resoles. Such hardener blends can then be added to phenolic resoles in an amount from 5-15% w/w, preferably from 5-10% w/w of the total formulation. Using a formulation according to the present invention, it is possible to obtain bulk pot lives of between 30 minutes and 3 hours at ambient temperatures. However, if the temperature is from 60°-80° C., the pot lives will be in the range from 1-10 minutes.

The partial phosphate esters used in the present invention give a pot life of at least one hour at ambient temperatures to the resoles which is sufficient time for the work-up procedures involved in normal preparation of reinforced phenolic resin composites.

The delayed-action hardeners of the present invention allow greater flexibility in process control and minimise wastage of resoles due to premature gelation or hardening.

In use, the hardener has been found to be very safe to handle and with only a slight odour, unlike those conventionally used. The use of these hardeners does not adversely affect the physical properties of the finished composite. Residual acid contents in a fully cured composite prepared with these ester hardeners have been found to be less than 50% of that measured with conventional acid hardeners. Furthermore, the use of such products is known to inhibit corrosion of metals which are in contact with such composites. In contrast, the use of conventional acid hardeners may promote corrosion. The use of these hardeners does not adversely affect the physical properties of the finished composite.

The process of the present invention is further illustrated with reference to the following Examples.

Examples

A partial phosphate ester, BUDIT 381 (Regd. Trade Mark), prepared from ortho-phosphoric acid, ethane diol and pentaerythritol in the respective molar ratios of 2:1:0.75 was used in the following Examples:

This partial phosphate ester contains 75% w/w active matter in aqueous solution. This solution was the delayed action hardener system which was then used for curing a phenolic resole into a hardened resin.

The phenol-aldehyde resole used had the following characteristics:

Resole: Phenol-formaldehyde (Phenol to formaldehyde mole ratio 1:1.6) Viscosity at 25° C.: 2.45–3.7 poise 25° C. Specific gravity: 1.223 pH: 7.4 Free formaldehyde: 2.5% wt 8% w/w of the hardener prepared above was added to the resin at different temperatures and the pot-life was determined. The results were:

| POT LIVES | | | |
|---|---|---|---|
| 75% w/w aq. Hardener 8% wt addition | 20° C. (ambient) 1 hour | 30° C. 12 min 15 sec | 40° C. 7 min 46 sec |

When 8% w/w of 75% wt hardener solution was added to a phenolic resole and used to prepare a glass fibre reinforced composite, the time to cure and release the moulding at an elevated temperature of 75° C. was of the same order as experienced with standard catalysts.

The above procedure was repeated using various concentrations of the hardener and the performance was compared with standard Phencat 10 (Regd. Trade Mark, an aqueous solution or orthophosphoric acid and p-toluene sulphonic acid, ex Libra Chemicals, UK) hardeners. The results are tabulated below.

TABLE 1

AMBIENT POT-LIVES OF PARTIAL PHOSPHATE ESTER HARDENER AT VARIOUS CONCENTRATIONS

| Examples | % wt SOLN. | % ADDED (pbw) | Time | COMMENTS |
|---|---|---|---|---|
| 1 | 80% | 4 | > 1 HOUR | No exotherm |
|   |     | 6 | 28 min 27 sec | Exotherm |
|   |     | 8 | 14 min 56 sec | Exotherm |
|   |     | 10 | 14 min 28 sec | Exotherm |
| 2 | 75% | 5 | > 1 HOUR | Did Harden after 1.5-2 hrs @ ambient. |
| 3 | 70% | 5 | > 1 HOUR | hardened after 48 hrs @ ambient. |
| 4 | 70% | 8 | > 1 HOUR | Exothermed after 2.5 hrs @ ambient. |

NOTES
In comparative Experiments the following results were observed:
POT LIFE USING 5% PHENCAT 10 = 9 min 03 sec
POT LIFE USING 8% PHENCAT 10 = 4 min 13 sec It can be seen from these results that hardeners of the present invention have a decided advantage in their ability to delay the hardening process.

I claim:

1. A hardener for producing phenolic resins from phenolic resoles by adding the hardener to the phenolic resole and allowing the phenolic resole to harden into a phenolic resin, said hardener comprising a partial phosphate ester.

2. A hardener according to claim 1 wherein the partial phosphate ester is produced by reacting condensed phosphoric acids with polyols at controlled temperatures with vigorous agitation under vacuum until constant acidity is achieved.

3. A hardener according to claim 2 wherein the phosphoric acid used is orthophosphoric acid or a condensate thereof.

4. A hardener according to claim 2 wherein the polyol used for producing the ester is selected from one or more of glycerol, pentaerythritol, insoitol, sucrose, the monosaccharides and hydroxy functional polymers derivable from polystyrene and alkyl alcohols.

5. A hardener according to claim 1 wherein the partial phosphate esters have an acid value of upto 600 mg/g KOH.

6. A hardener according to claim 1 wherein the partial phosphate esters have a phosphorous content of about 15-25% w/w.

7. A hardener according to claim 1 wherein the partial phosphate ester is produced by reacting orthophosphoric acid, pentaerythritol and glycerol in molar ratios of 2:1:1 respectively until the final acid value of the product is 375 mg/g KOH.

8. A hardener according to claim 1 wherein the partial phosphate ester is produced by reacting orthophosphoric acid, ethane diol and pentaerythritol in molar ratios of 2:1:0.75 respectively.

9. A hardener according to claim 1 wherein said hardener is used as a solution in a solvent containing at least 70% w/w of the hardner.

10. A hardener as claimed in claim 2 wherein said polyol is ethanediol.

* * * * *

UNITED STATES PATENT AND TRADEMARK OFFICE
CERTIFICATE OF CORRECTION

PATENT NO. : 5,378,793
DATED : January 3, 1995
INVENTOR(S) : MURRAY R. ORPIN

It is certified that error appears in the above-indentified patent and that said Letters Patent is hereby corrected as shown below:

Col. 4, l. 55, there should be a new paragraph starting with "8% w/w of the hardener"

Rewrite claim 1 as follows:

1. In a process for making phenolic resins from phenolic resoles with an acidic hardener, the improvement which comprises using as said acid hardener a composition comprising a partial phosphate ester.

Claims 2-9 and 10, line 1 of each claim, strike "hardener" and insert --process-- therefor.

Add the following claim:

UNITED STATES PATENT AND TRADEMARK OFFICE
CERTIFICATE OF CORRECTION

PATENT NO. : 5,378,793

DATED : January 3, 1995

INVENTOR(S) : MURRAY R. ORPIN

It is certified that error appears in the above-indentified patent and that said Letters Patent is hereby corrected as shown below:

11. A formulation comprising an acid hardenable phenol-formaldehyde resole and a hardener comprising a partial phosphate ester.

Signed and Sealed this

First Day of August, 1995

Attest:

BRUCE LEHMAN

Attesting Officer — Commissioner of Patents and Trademarks